(12) United States Patent
Kwon et al.

(10) Patent No.: US 12,207,167 B1
(45) Date of Patent: Jan. 21, 2025

(54) BIDIRECTIONAL LINK DEVICE AND METHOD FOR V2X-BASED AUTONOMOUS COOPERATIVE TRAVELING

(71) Applicant: Industry-Academic Cooperation Foundation of Yeungnam University, Gyeongsan-si (KR)

(72) Inventors: Seong Jin Kwon, Gyeongsan-si (KR); Hyun Woo Jin, Gyeongsan-si (KR)

(73) Assignee: Industry-Academic Cooperation Foundation of Yeungnam University, Gyeongsan-si (KR)

( * ) Notice: Subject to any disclaimer, the term of this patent is extended or adjusted under 35 U.S.C. 154(b) by 0 days.

(21) Appl. No.: 18/669,533

(22) Filed: May 21, 2024

(30) Foreign Application Priority Data

Nov. 6, 2023 (KR) .......................... 10-2023-0151472

(51) Int. Cl.
*H04W 4/40* (2018.01)
*H04W 72/20* (2023.01)
*H04W 72/566* (2023.01)

(52) U.S. Cl.
CPC ............ *H04W 4/40* (2018.02); *H04W 72/20* (2023.01); *H04W 72/566* (2023.01)

(58) Field of Classification Search
CPC ................................ H04W 4/40; H04W 72/23
USPC ................................... 340/425.5; 342/357.64
See application file for complete search history.

(56) References Cited

U.S. PATENT DOCUMENTS

2023/0282109 A1\* 9/2023 Monteuuis ....... G08G 1/096791
2024/0146426 A1\* 5/2024 Shaked ................ H04B 17/345

FOREIGN PATENT DOCUMENTS

| KR | 10-2214558 B1 | 2/2021 |
| KR | 10-2023-0010728 A | 1/2023 |
| KR | 10-2023-0035323 A | 3/2023 |
| KR | 10-2023-0100893 A | 7/2023 |

\* cited by examiner

*Primary Examiner* — Kiet M Doan
(74) *Attorney, Agent, or Firm* — NKL LAW; Jae Youn Kim (57) ABSTRACT

Disclosed are a bidirectional link device and method for V2X-based autonomous cooperative traveling. The bidirectional link device mounted on an autonomous cooperative traveling vehicle to support V2X communication between the autonomous cooperative traveling vehicle and a plurality of autonomous traveling infrastructure devices includes a communication standard detector that detects a communication standard of a sharing infrastructure device that is an autonomous traveling infrastructure device that will perform the V2X communication among the plurality of autonomous traveling infrastructure devices, an encoder/decoder that encodes vehicle information of the autonomous cooperative traveling vehicle using the detected communication standard and decodes infrastructure information of the sharing infrastructure device, and a link controller that controls the encoding and the decoding according to a predetermined criterion.

9 Claims, 5 Drawing Sheets

BIDIRECTIONAL LINK DEVICE AND METHOD FOR V2X-BASED AUTONOMOUS COOPERATIVE TRAVELING

CROSS-REFERENCE TO RELATED APPLICATION

This application claims priority to and the benefit of Korean Patent Application No. 10-2023-0151472 filed in the Korean Intellectual Property Office on Nov. 6, 2023, the entire contents of which are incorporated herein by reference.

TECHNICAL FIELD

The present invention relates to a V2X-based communication technology, and more specifically, to a bidirectional link device and method for V2X-based autonomous cooperative traveling for performing support so that smooth information sharing is performed in both directions between an autonomous cooperative vehicle and an autonomous traveling infrastructure.

BACKGROUND

Vehicle to everything (V2X) communication refers to a technology for communicating with various elements on a road in order for a vehicle to autonomously travel. For example, the V2X communication is configured of vehicle to vehicle (V2V) communication for informing of a forward traffic situation and approach between vehicles, vehicle to infrastructure (V2I) communication for communicating with traffic infrastructure such as traffic lights, and vehicle to pedestrian (V2P) communication for supporting pedestrian information.

Meanwhile, in research and development, demonstration complex service, or the like related to an autonomous cooperative vehicle, respective service data is constructed and exchanged and interoperability is not secured.

Therefore, an autonomous cooperative traveling vehicle can perform an interlocking test for the V2V communication and the V2I communication in a specific region, but has a problem that it is difficult to perform continuous interlocking tests for various regions and various standards.

SUMMARY

The problem to be solved by the present invention is to provide a bidirectional link device and method for V2X-based autonomous cooperative traveling for performing support so that an autonomous cooperative traveling vehicle shares information in both directions with an autonomous traveling infrastructure device in all regions where V2X communication is supported. To solve the above problem, a bidirectional link device mounted on an autonomous cooperative traveling vehicle to support vehicle to everything (V2X) communication between the autonomous cooperative traveling vehicle and a plurality of autonomous traveling infrastructure devices according to the present invention includes a communication standard detector configured to detect a communication standard of a sharing infrastructure device, the sharing infrastructure device being an autonomous traveling infrastructure device that will perform the V2X communication among the plurality of autonomous traveling infrastructure devices; an encoder/decoder configured to encode vehicle information of the autonomous cooperative traveling vehicle using the detected communication standard and decode infrastructure information of the sharing infrastructure device; and a link controller configured to control the encoding and the decoding according to a predetermined criterion.

Further, the communication standard detector sets a priority for each sharing infrastructure device when there are a plurality of the sharing infrastructure devices and detects the communication standard according to the set priority.

Further, the communication standard detector sets a higher priority in order of a sharing infrastructure device performing vehicle to pedestrian (V2P) communication, a sharing infrastructure device performing vehicle to infrastructure (V2I) communication, and a sharing infrastructure device performing vehicle to vehicle (V2V) communication.

Further, the communication standard detector sets a higher priority for a sharing infrastructure device closer to the autonomous cooperative traveling vehicle when there are a plurality of sharing infrastructure devices performing the same communication.

Further, the link controller selects only vehicle-related information from the decoded infrastructure information based on the communication standard and performs support so that the autonomous cooperative traveling vehicle uses the selected information.

Further, the link controller first performs the decoding before the encoding to preferentially support the collection of information on the autonomous traveling of the autonomous cooperative vehicle when the encoding and the decoding are requested simultaneously.

Further, the link controller divides the vehicle information to be encoded into a plurality of pieces when a data capacity of the vehicle information exceeds a preset capacity, and encodes each of the pieces of divided vehicle information.

A bidirectional link method performed by a bidirectional link device mounted on an autonomous cooperative traveling vehicle to support V2X communication between the autonomous cooperative traveling vehicle and a plurality of autonomous traveling infrastructure devices according to the present invention includes a step of detecting a communication standard of a sharing infrastructure device, the sharing infrastructure device being an autonomous traveling infrastructure device that will perform the V2X communication among the plurality of autonomous traveling infrastructure devices; and a link control step of encoding vehicle information of the autonomous cooperative traveling vehicle using the detected communication standard according to a predetermined criterion and decoding infrastructure information of the sharing infrastructure device according to a predetermined criterion.

Further, the detecting step includes setting a priority for each sharing infrastructure device when there are a plurality of the sharing infrastructure devices and detecting the communication standard according to the set priority.

Further, the detecting step includes setting a higher priority in order of a sharing infrastructure device performing V2P communication, a sharing infrastructure device performing V2I communication, and a sharing infrastructure device performing V2V communication.

Further, the detecting step includes setting a higher priority for a sharing infrastructure device closer to the autonomous cooperative traveling vehicle when there are a plurality of sharing infrastructure devices performing the same communication.

Further, the link control step includes selecting only vehicle-related information from the decoded infrastructure information based on the communication standard and performing support so that the autonomous cooperative traveling vehicle uses the selected information.

Further, the link control step includes first performing the decoding before the encoding to preferentially support the collection of information on the autonomous traveling of the autonomous cooperative vehicle when the encoding and the decoding are requested simultaneously.

Further, the link control step includes dividing the vehicle information to be encoded into a plurality of pieces when a data capacity of the vehicle information exceeds a preset capacity, and encoding each of the pieces of divided vehicle information.

Further, an autonomous cooperative traveling vehicle for performing autonomous traveling while performing V2X communication with a plurality of autonomous traveling infrastructure devices according to the present invention includes an autonomous traveling control device configured to collect information related to the autonomous cooperative traveling vehicle to generate vehicle information, and controls the autonomous traveling; a communication terminal device configured to transmit the vehicle information to at least one of the autonomous traveling infrastructure devices or receive infrastructure information of the autonomous traveling infrastructure device; and a bidirectional link device included between the autonomous traveling control device and the communication terminal device to support the V2X communication so that the vehicle information and the infrastructure information are shared, wherein the bidirectional link device includes a communication standard detector configured to detect a communication standard of a sharing infrastructure device, the sharing infrastructure device being an autonomous traveling infrastructure device that will perform the V2X communication among the plurality of autonomous traveling infrastructure devices; an encoder/decoder configured to encode the vehicle information of the autonomous cooperative traveling vehicle using the detected communication standard and decode infrastructure information of the sharing infrastructure device; and a link controller configured to control the encoding and the decoding according to a predetermined criterion.

According to an embodiment of the present invention, it is possible for the autonomous cooperative traveling vehicle to smoothly share information in both directions with the autonomous traveling infrastructure device in all regions where V2X communication is supported, by encoding and decoding vehicle information of the autonomous cooperative traveling vehicle and infrastructure information of the autonomous traveling infrastructure device based on a communication standard according to each communication environment.

Thus, it is possible to secure the safety of the autonomous traveling by the autonomous cooperative traveling vehicle collecting a variety of information.

DETAILED DESCRIPTION

Hereinafter, embodiments of the present invention will be described in detail with reference to the attached drawings so that those skilled in the art can easily implement the present invention. However, the present invention may be implemented in many different forms and is not limited to the embodiments described herein. In order to clearly describe the present invention in the drawings, parts unrelated to the description are omitted, and similar parts are denoted by similar reference signs throughout the specification.

In the present specification and drawings (hereinafter referred to as "the present specification"), duplicate description of the same components will be omitted.

Also, in the present specification, when a component is mentioned as being 'coupled' or 'connected' to another component, the component may be directly coupled or connected to the other component, but it should be understood that there may be another component in between. On the other hand, in the present specification, when a component is mentioned as being 'directly coupled' or 'directly connected' to another component, it should be understood that there are no other component in between.

Further, the terms used in the present specification are merely used to describe specific embodiments and are not intended to limit the present invention.

Also in the present specification, singular expressions may include plural expressions, unless the context clearly indicates otherwise.

In addition, it should be understood that, in the present specification, terms such as 'include' or 'have' are only intended to designate the presence of features, numbers, steps, operations, components, parts, or combinations thereof described in the specification, and does not exclude a likelihood of the presence or addition of one or more other features, numbers, steps, operations, components, parts, or combinations thereof in advance.

Also, in the present specification, the term 'and/or' includes a combination of a plurality of described items or any of the plurality of described items. In the present specification, 'A or B' may include 'A', 'B', or 'both A and B'.

Further, in the present specification, detailed descriptions of well-known functions and configurations that may obscure the gist of the present invention will be omitted.

Figure 1:
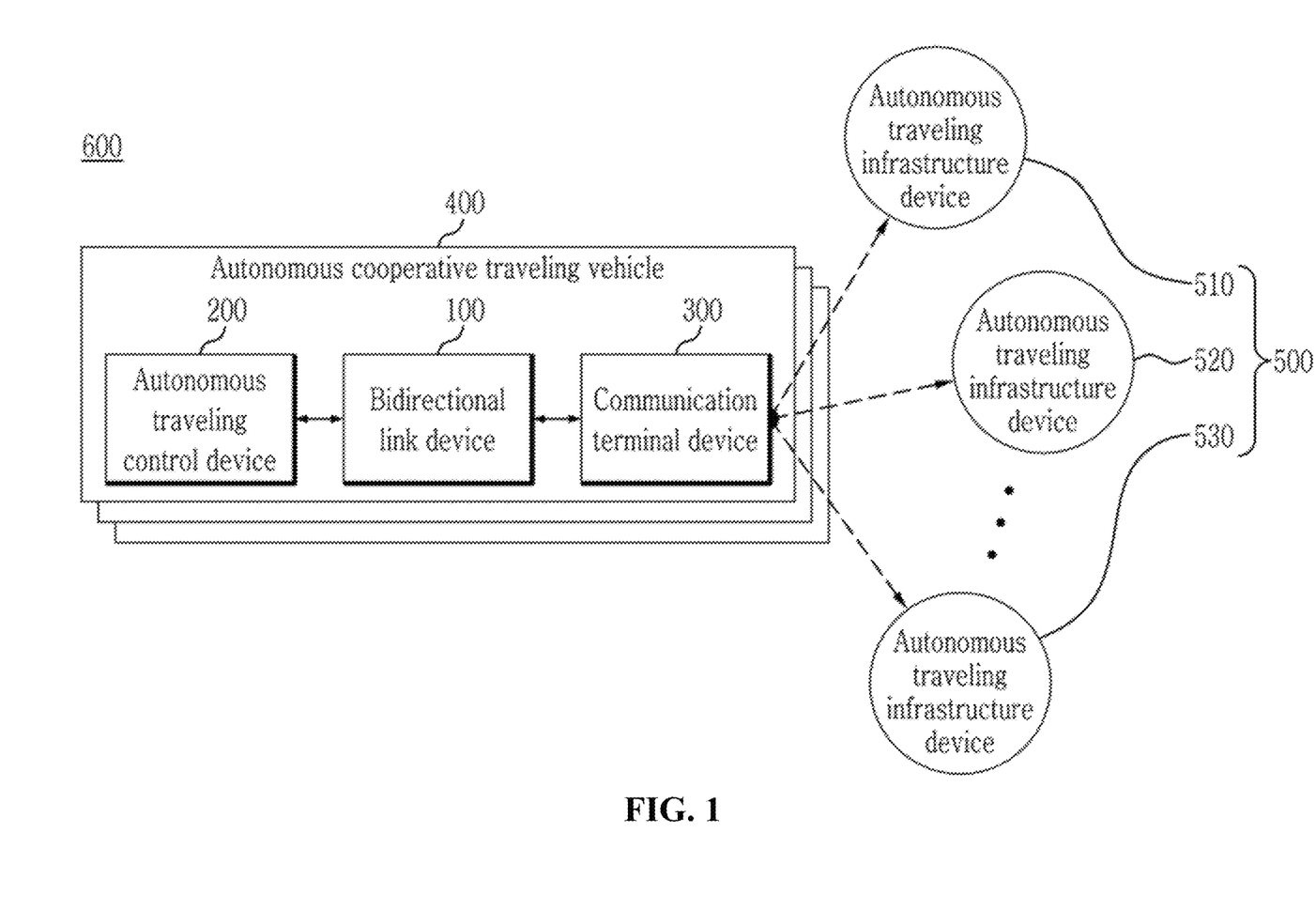
FIG. 1 is a block diagram illustrating an autonomous cooperative traveling system according to an embodiment of the present invention.
Figure 2:
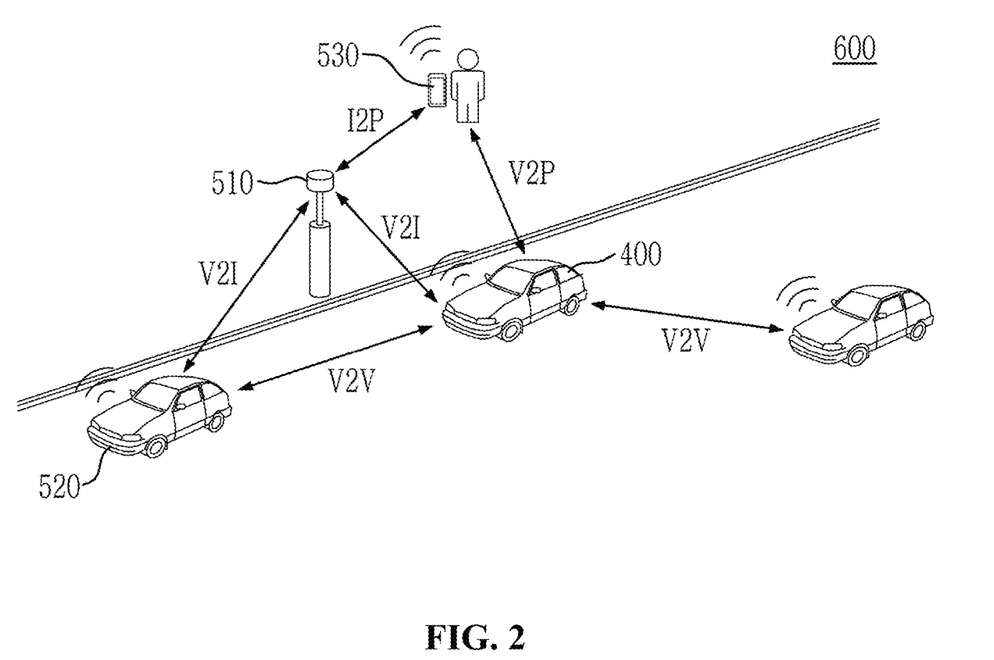
FIG. 2 is a diagram illustrating communication types supported by the autonomous cooperative traveling system according to the embodiment of the present invention.

FIG. 1 is a configuration diagram illustrating an autonomous cooperative traveling system according to an embodiment of the present invention, and FIG. 2 is a diagram illustrating communication types supported by the autonomous cooperative traveling system according to the embodiment of the present invention.

Referring to FIGS. 1 and 2, an autonomous cooperative traveling system 600 supports an autonomous cooperative traveling vehicle 400 sharing information with an autonomous traveling infrastructure device 500 in both directions in all regions where V2X communication is supported. The autonomous cooperative traveling system 600 includes at least one autonomous cooperative traveling vehicle 400 and a plurality of autonomous traveling infrastructure devices 500.

The autonomous cooperative traveling vehicle 400 is at least one vehicle that performs autonomous traveling, and performs communication with the autonomous traveling infrastructure device 500 for a road on which the autonomous cooperative traveling vehicle 400 travels, to collect infrastructure information, and performs autonomous traveling using the collected infrastructure information. The autonomous cooperative traveling vehicle 400 includes a bidirectional link device 100, an autonomous traveling control device 200, and a communication terminal device 300.

The bidirectional link device 100 is included between the autonomous traveling control device 200 and the communication terminal device 300 and supports bidirectional communication so that vehicle information and infrastructure information are shared. In detail, the bidirectional link device 100 encodes the vehicle information generated from the autonomous traveling control device 200 and transfers the encoded vehicle information to the communication terminal device 300. Also, the bidirectional link device 100 decodes the infrastructure information received from the communication terminal device 300 and transfers the decoded infrastructure information to the autonomous traveling control device 200. Accordingly, the bidirectional link device 100 performs control so that the vehicle information is transferred to the autonomous traveling infrastructure device 500 and the infrastructure information is transferred to the autonomous traveling control device 200. In this case, the bidirectional link device 100 may perform encoding and decoding based on communication standards supported by each of autonomous traveling infrastructure devices 510, 520, and 530 with which information is shared.

The autonomous traveling control device 200 is an autonomous computing unit (ACU) and controls the overall autonomous traveling of the autonomous cooperative traveling vehicle 400. In this case, the autonomous traveling control device 200 generates vehicle information related to the autonomous cooperative traveling vehicle 400. Here, the vehicle information may include vehicle identification information, speed information, acceleration information, direction information, gravity information, position information, image information, and the like. The autonomous traveling control device 200 transfers the vehicle information to the bidirectional link device 100 so that the vehicle information can be transmitted to the autonomous traveling infrastructure device 500. Also, the autonomous traveling control device 200 may receive at least one piece of infrastructure information from the bidirectional link device 100 and control the autonomous traveling using the transferred infrastructure information.

The communication terminal device 300 performs V2X communication with the autonomous traveling infrastructure device 500. The communication terminal device 300 transmits the encoded vehicle information from the bidirectional link device 100 to the autonomous traveling infrastructure device 500. Also, the communication terminal device 300 transfers the infrastructure information received from the autonomous traveling infrastructure device 500 to the bidirectional link device 100. The communication terminal device 300 may perform the V2I communication when the autonomous traveling infrastructure device 510 is a roadside unit (RSU) that is a road infrastructure, perform the V2V communication when the autonomous traveling infrastructure device 520 is the autonomous cooperative traveling vehicle 520, and perform the V2P communication when the autonomous traveling infrastructure device 530 is a user terminal used by a pedestrian. The communication terminal device 300 may support various communication standards to perform the above-described communications.

The autonomous traveling infrastructure device 500 provides infrastructure information necessary for the autonomous cooperative traveling vehicle 400 to perform autonomous traveling through the V2X communication. Here, the infrastructure information may include identification information of the autonomous traveling infrastructure device 500, movement speed information of the autonomous traveling infrastructure device 500, information on a distance to the autonomous cooperative traveling vehicle 400, traffic signal information, road information, traffic amount information, weather information, and the like. There are the plurality of autonomous traveling infrastructure devices 500, which may preferably include RSUs, autonomous traveling vehicles, autonomous cooperative traveling vehicles, user terminals, and the like. Each of the plurality of autonomous traveling infrastructure devices 510, 520, and 530 may perform communication using different communication standards, perform communication using the same communication standards, or perform communication using both the different communication standards and the same communication standard. Here, each autonomous traveling infrastructure device 500 may transmit the infrastructure information in a broadcast manner.

Figure 3:
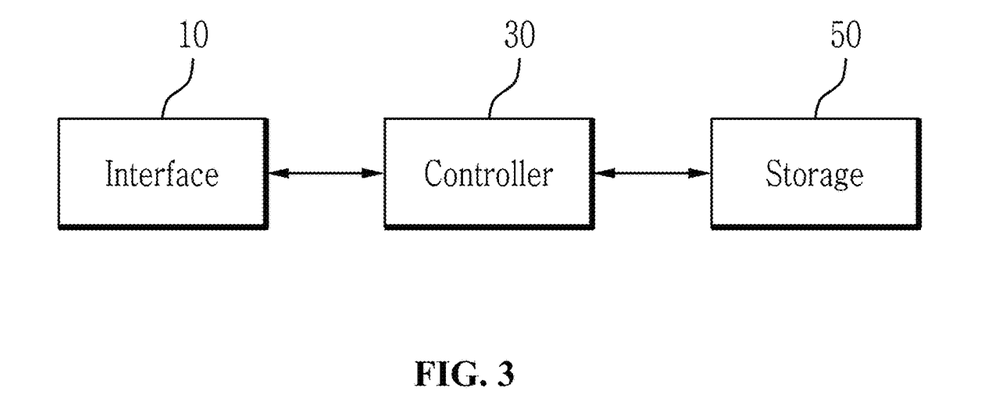
FIG. 3 is a block diagram illustrating a bidirectional link device according to an embodiment of the present invention.

FIG. 3 is a block diagram illustrating a bidirectional link device according to an embodiment of the present invention.

Referring to FIGS. 1 to 3, the bidirectional link device 100 includes an interface 10, a controller 30, and a storage 50.

The interface 10 performs communication with the autonomous traveling control device 200 and the communication terminal device 300. The interface 10 receives vehicle information transferred from the autonomous traveling control device 200 and transmits the decoded infrastructure information to the autonomous traveling control device 200. Further, the interface 10 receives the infrastructure information transferred from the communication terminal device 300 and transfers the encoded vehicle information to the communication terminal device 300.

The controller 30 performs overall control of the bidirectional link device 100. The controller 30 detects a communication standard of the sharing infrastructure device which is an autonomous traveling infrastructure device that will perform communication among the plurality of autonomous traveling infrastructure devices 510, 520, and 530. The sharing infrastructure device refers to an autonomous traveling infrastructure device other than autonomous traveling infrastructure devices that are far from the autonomous cooperative traveling vehicle 400 and have a difficulty in confirming signals among the plurality of autonomous traveling infrastructure devices 510, 520, and 530. When vehicle information of the autonomous cooperative traveling vehicle 400 is transmitted to the sharing infrastructure device, the controller 30 encodes the vehicle information using the detected communication standard and performs control so that the encoded vehicle information is transmitted to the sharing infrastructure device. Also, when the controller 30 transfers infrastructure information of the sharing infrastructure device to the autonomous traveling control device 200, the controller 30 decodes the infrastructure information using the detected communication standard and performs control so that the decoded infrastructure information is transferred to the autonomous traveling control device 200.

The storage 50 stores a program or algorithm to be driven by the bidirectional link device 100. The storage 50 stores a communication standard for performing V2X communication. In this case, the communication standard means information on known communication protocols and specifications. The storage 50 stores the vehicle information and the infrastructure information. The storage 50 may include at least one storage medium among a flash memory type, a hard disk type, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

Figure 4:
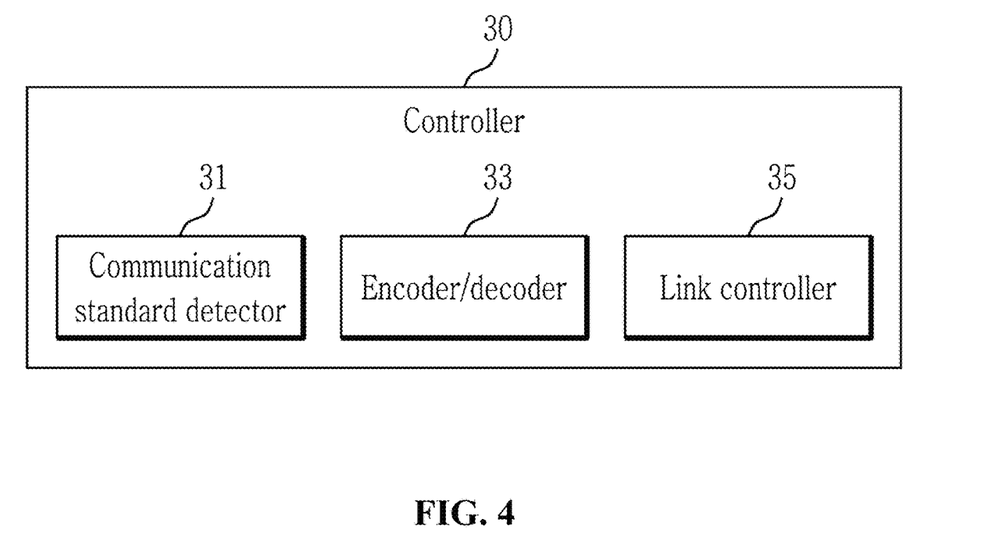
FIG. 4 is a block diagram illustrating a controller according to an embodiment of the present invention.

FIG. 4 is a block diagram illustrating the controller according to an embodiment of the present invention.

Referring to FIGS. 1 to 4, the controller 30 includes a communication standard detector 31, an encoder/decoder 33, and a link controller 35.

The communication standard detector 31 detects the communication standard of the sharing infrastructure device that is an autonomous traveling infrastructure device that will perform the V2X communication among the plurality of autonomous traveling infrastructure devices 500. The communication standard detector 31 may select a device that is located within a preset distance from the autonomous cooperative traveling vehicle 400 and is able to perform V2X communication, as the sharing infrastructure device. The communication standard detector 31 receives an infrastructure signal in a broadcast manner transmitted from the plurality of autonomous traveling infrastructure devices 500, and detects a communication standard of the infrastructure signal by using the received infrastructure signal. In this case, the communication standard detector 31 may perform comparison with information of pre-stored communication standard to detect the communication standard of the infrastructure signal. Here, when the communication standard of the infrastructure signal matches the information of the pre-stored communication standard, the communication standard detector 31 may detect the matched communication standard as the communication standard of the infrastructure signal. Also, when the communication standard of the infrastructure signal does not match the information of the pre-stored communication standard, the communication standard detector 31 may detect a communication standard having the most similar structure among the pre-stored communication standards as the communication standard of the infrastructure signal.

When there are a plurality of sharing infrastructure devices, the communication standard detector 31 may set a priority for each sharing infrastructure device and detect the communication standard according to the set priority. The communication standard detector 31 may set a higher priority in order of a sharing infrastructure device performing V2P communication, a sharing infrastructure device performing V2I communication, and a sharing infrastructure device performing V2V communication. That is, the communication standard detector 31 may set the priority so that the safety of pedestrians is prioritized. For example, when the sharing infrastructure devices are the RSU 510, another autonomous cooperative traveling vehicle 520, and a user terminal 530 used by a pedestrian, and the infrastructure signal is received from the sharing infrastructure device, the communication standard detector 31 may detect the communication standard in order of the user terminal 530, the RSU 510, and the other autonomous cooperative traveling vehicle 520 and perform support so that pedestrian-related information is preferentially provided to the autonomous traveling control device 200.

Further, when there are a plurality of sharing infrastructure devices performing the same communication, the communication standard detector 31 sets a higher priority for the sharing infrastructure device closer to the autonomous cooperative traveling vehicle 400. For example, when the sharing infrastructure devices are a first RSU 510, a second RSU (not shown) farther from the autonomous cooperative traveling vehicle 400 than the first RSU 510, and the user terminal 530, and the infrastructure signal is received from the sharing infrastructure, the communication standard detector 31 may detect the communication standard in order of the user terminal 530, the first RSU 510, and the second RSU, and perform support so that the pedestrian-related information is preferentially provided to the autonomous traveling control device 200 and then, information on the infrastructure device that may have a further influence on the autonomous traveling is provided to the autonomous traveling control device 200.

The encoder/decoder 33 encodes the vehicle information of the autonomous cooperative traveling vehicle 400 so that the V2X communication can be performed. The encoder/decoder 33 encodes the vehicle information according to the communication standard of each sharing infrastructure device. Further, the encoder/decoder 33 performs decoding so that content included in the encoded infrastructure information of the sharing infrastructure device can be confirmed. The encoder/decoder 33 decodes the encoded infrastructure information according to the communication standard of the sharing infrastructure device. Here, the encoder/decoder 33 may perform encoding and decoding through known encoding and decoding technologies.

The link controller 35 controls encoding and decoding according to a predetermined criterion. The link controller 35 may control encoding according to a communication standard of the sharing infrastructure device to which the vehicle information is transmitted. For example, when the vehicle information is transmitted to a first sharing infrastructure device that performs communication using communication standard A, a second sharing infrastructure device that performs communication using communication standard B, and a third sharing infrastructure device that performs communication using communication standard A, the link controller 35 may encode the vehicle information to be transmitted to the first sharing infrastructure device and the third sharing infrastructure device based on communication standard A, and encode the vehicle information to be transmitted to the second sharing infrastructure device based on communication standard B. Also, the link controller 35 may control the decoding according to the communication standard of the sharing infrastructure device that transmits the encoded infrastructure information. For example, when the infrastructure information is received from the first sharing infrastructure device that performs communication using communication standard A, the second sharing infrastructure device that performs communication using communication standard B, and the third sharing infrastructure device that performs communication using communication standard A, the link controller 35 may decode the infrastructure information received from the first sharing infrastructure device and the third sharing infrastructure device based on communication standard A, and decode the infrastructure information received from the second sharing infrastructure device based on communication standard B. In this case, the link controller 35 may select only vehicle-related information from the decoded infrastructure information based on the communication standard, and perform support so that the autonomous cooperative traveling vehicle 400 uses the selected information. That is, the link controller 35 may filter unnecessary information from the decoded infrastructure information and then perform control so that the decoded infrastructure information is transferred to the autonomous traveling control device 200.

When encoding and decoding are simultaneously requested, the link controller 35 preferentially supports information collection on autonomous traveling of the autonomous cooperative traveling vehicle 400 by performing decoding prior to encoding. Accordingly, the autonomous cooperative traveling vehicle 400 may rapidly collect more information to ensure safety of autonomous traveling. Also, when a data capacity of vehicle information to be encoded exceeds a preset capacity, the link controller 35 may divide the vehicle information into a plurality of pieces. The link controller 35 may encode and transmit the divided vehicle information separately.

Figure 5:
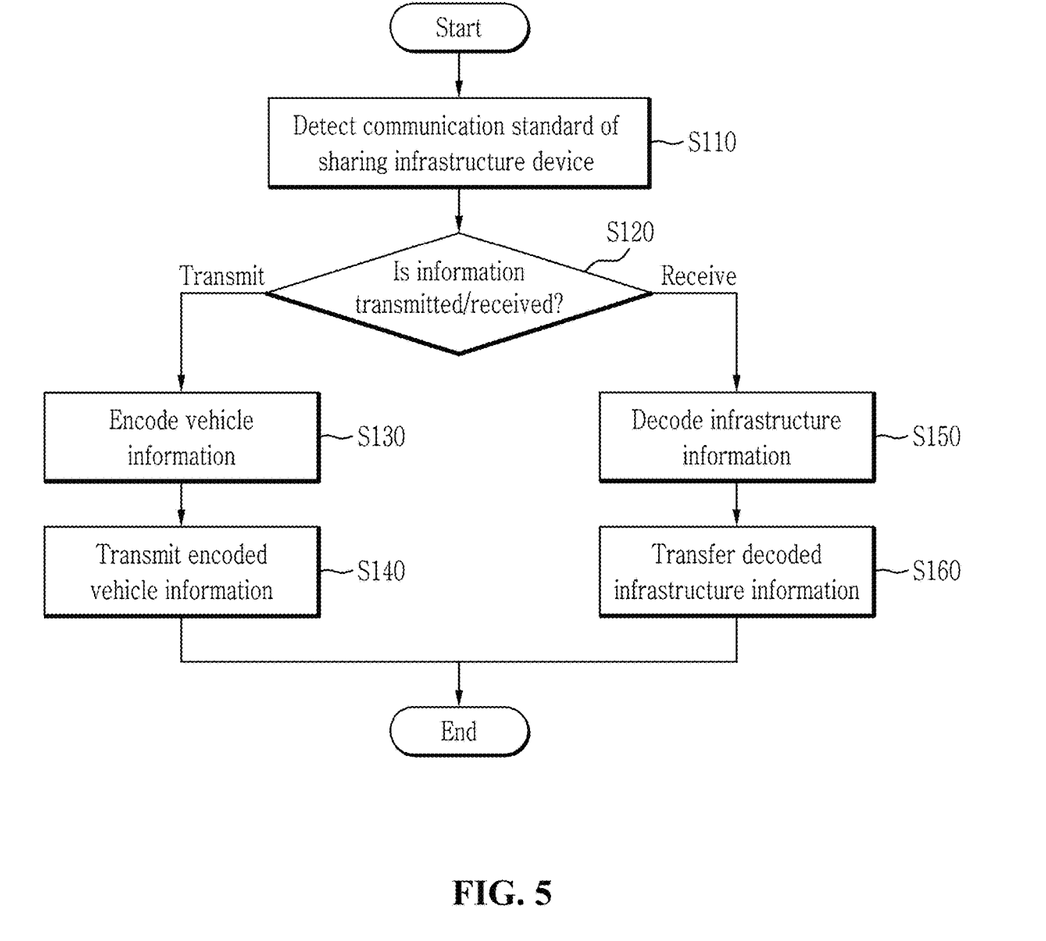
FIG. 5 is a flowchart illustrating a bidirectional link method according to an embodiment of the present invention.

FIG. 5 is a flowchart illustrating a bidirectional link method according to an embodiment of the present invention.

Referring to FIGS. 1 and 5, the bidirectional link method includes encoding and decoding vehicle information of the autonomous cooperative traveling vehicle 400 and infrastructure information of the autonomous traveling infrastructure device 500 based on a communication standard according to each communication environment. Thus, the bidirectional link method perform support so that the autonomous cooperative traveling vehicle 400 can smoothly share information in both directions with the autonomous traveling infrastructure device 500 in all regions where V2X communication is supported. That is, with the bidirectional link method, it is possible to secure the safety of the autonomous traveling by the autonomous cooperative traveling vehicle 400 collecting a variety of information.

In step S110, the bidirectional link device 100 detects the communication standard of the sharing infrastructure device. The bidirectional link device 100 may detect the communication standard of the sharing infrastructure device that is an autonomous traveling infrastructure device that will perform the V2X communication among the plurality of autonomous traveling infrastructure devices 500.

In step S120, the bidirectional link device 100 determines whether or not the vehicle information of the autonomous cooperative traveling vehicle 400 is transmitted or whether or not the encoded infrastructure information of the sharing infrastructure device is received. The bidirectional link device 100 performs step S130 when the vehicle information is transmitted, and performs step S150 when the encoded infrastructure information is received.

In step S130, the bidirectional link device 100 encodes the vehicle information of the autonomous cooperative traveling vehicle 400. The bidirectional link device 100 encodes the vehicle information according to the communication standard of each sharing infrastructure device.

In step S140, the bidirectional link device 100 performs control so that the encoded vehicle information is transmitted to the sharing infrastructure device. The bidirectional link device 100 may transfer the encoded vehicle information to the communication terminal device 300 and perform support so that the communication terminal device 300 can transmit the encoded vehicle information to the sharing infrastructure device.

In step S150, the bidirectional link device 100 decodes the infrastructure information of the sharing infrastructure device. The bidirectional link device 100 decodes the encoded infrastructure information according to the communication standard of the sharing infrastructure device.

In step S160, the bidirectional link device 100 transfers the decoded infrastructure information to the autonomous traveling control device 200. The bidirectional link device 100 transfers the decoded infrastructure information to the autonomous traveling control device 200 and performs support so that the decoded infrastructure information is reflected in the autonomous traveling of the autonomous cooperative traveling vehicle 400.

Figure 6:
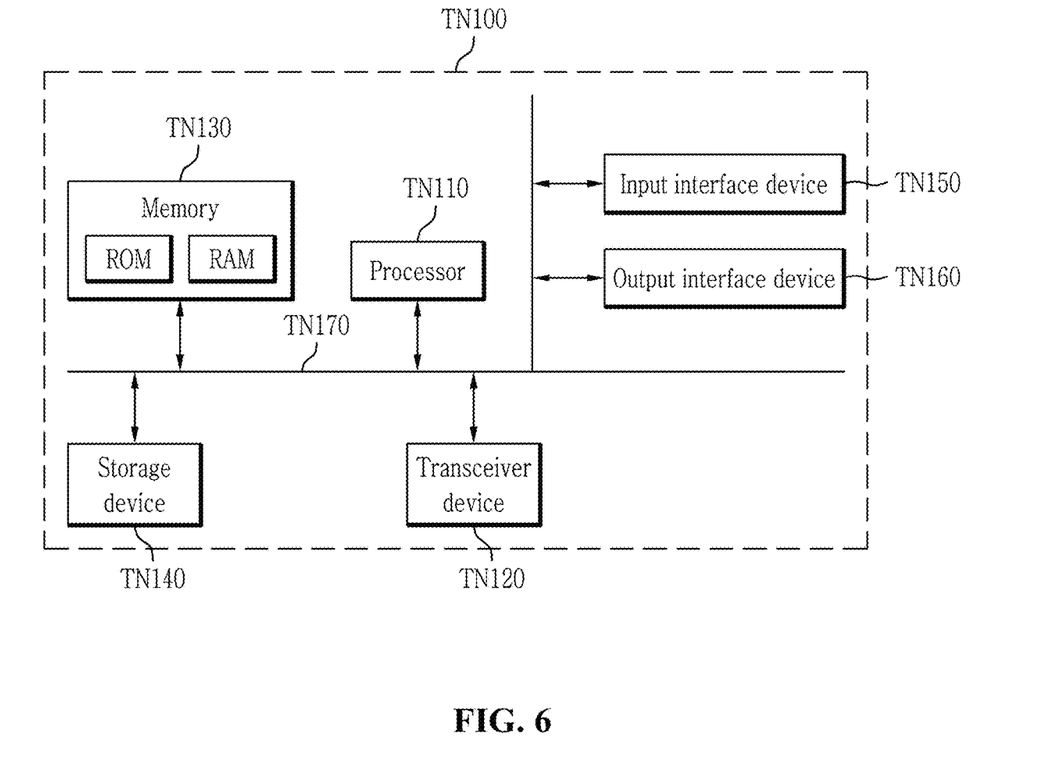
FIG. 6 is a block diagram illustrating a computing device according to an embodiment of the present invention.

FIG. 6 is a block diagram illustrating a computing device according to an embodiment of the present invention.

Referring to FIG. 6, a computing device TN100 may be a device described in the present specification (for example, the autonomous traveling control device, the bidirectional link device, the communication terminal device, or the autonomous traveling infrastructure device).

The computing device TN100 may include at least one processor TN110, a transceiver device TN120, and a memory TN130. Further, the computing device TN100 may further include, for example, a storage device TN140, an input interface device TN150, and an output interface device TN160. Components included in the computing device TN100 may be connected by a bus TN170 and perform communication with each other.

The processor TN110 may execute a program command stored in at least one of the memory TN130 and the storage device TN140. The processor TN110 may refer to a central processing unit (CPU), a graphics processing unit (GPU), or a dedicated processor on which methods according to embodiments of the present invention are performed. The processor TN110 may be configured to implement procedures, functions, and methods described in connection with the embodiments of the present invention. The processor TN110 may control each component of the computing device TN100.

Each of the memory TN130 and the storage device TN140 may store various types of information related to an operation of the processor TN110. Each of the memory TN130 and the storage device TN140 may be configured of at least one of a volatile storage medium and a non-volatile storage medium. For example, the memory TN130 may be configured of at least one of a read only memory (ROM) and a random access memory (RAM).

The transceiver device TN120 can transmit or receive a non-radio signal or a radio signal. The transceiver device TN120 may be connected to a network and perform communication.

Meanwhile, the embodiments of the present invention are not only implemented through the device and/or method described so far, but may also be implemented through a program that realizes the functions corresponding to the configuration of the embodiment of the present invention or a recording medium having the program recorded thereon, and this implementation can be easily performed by anyone skilled in the art from the description of the embodiments described above.

Although the embodiments of the present invention have been described above in detail, the right scope of the present invention is not limited thereto, and various modifications and improvements made by those skilled in the art using the basic concept of the present invention defined in the following claims also fall within the right scope of invention.

What is claimed is:

1. A bidirectional link device mounted on an autonomous cooperative traveling vehicle to support vehicle to everything (V2X) communication between the autonomous cooperative traveling vehicle and a plurality of autonomous traveling infrastructure devices, the bidirectional link device comprising:
- a communication standard detector configured to detect a communication standard of at least two sharing infrastructure devices, the at least two sharing infrastructure devices being among the plurality of autonomous traveling infrastructure devices that will perform the V2X communication among the plurality of autonomous traveling infrastructure devices, wherein the at least two sharing infrastructure devices communicate using different communication standards:
- an encoder/decoder configured to encode vehicle information of the autonomous cooperative traveling vehicle using the different detected communication standards and decode infrastructure information of the at least two sharing infrastructure devices, and
- a link controller configured to control the encoding and the decoding according to a predetermined criterion;
- wherein the communication standard detector sets a priority for each sharing infrastructure device and detects each communication standard according to the set priority;
- wherein the communication standard detector sets a higher priority in order of any sharing infrastructure device performing vehicle to pedestrian (V2P) communication, any sharing infrastructure device performing vehicle to infrastructure (V2I) communication, and any sharing infrastructure device performing vehicle to vehicle (V2V) communication;
- wherein the communication standard detector sets a higher priority for any sharing infrastructure device closer to the autonomous cooperative traveling vehicle than any other sharing infrastructure devices performing the same communication.

2. The bidirectional link device of claim 1, wherein the link controller selects only vehicle-related information from the decoded infrastructure information based on the detected communication standard and performs support so that the autonomous cooperative traveling vehicle uses the selected information.

3. The bidirectional link device of claim 1, wherein the link controller first performs the decoding before the encoding to preferentially support the collection of information on the autonomous traveling of the autonomous cooperative traveling vehicle when the encoding and the decoding are requested simultaneously.

4. The bidirectional link device of claim 1, wherein the link controller divides the vehicle information to be encoded into a plurality of pieces when a data capacity of the vehicle information exceeds a preset capacity, and encodes each of the pieces of divided vehicle information.

5. A bidirectional link method performed by a bidirectional link device mounted on an autonomous cooperative traveling vehicle to support V2X communication between the autonomous cooperative traveling vehicle and a plurality of autonomous traveling infrastructure devices, the bidirectional link method comprising:
- a step of detecting a communication standard of at least two sharing infrastructure devices, the at least two sharing infrastructure devices being among the plurality of autonomous traveling infrastructure devices that will perform the V2X communication among the plurality of autonomous traveling infrastructure devices, wherein the ai least two sharing infrastructure devices communicate using different communication standards; and
- a link control step of encoding vehicle information of the autonomous cooperative traveling vehicle using the different detected communication standards according to a predetermined criterion and decoding infrastructure information of the at least two sharing infrastructure devise devices according to a predetermined criterion;
- wherein the detecting step includes setting a priority for each sharing infrastructure device and detecting each communication standard according to the set priority;
- wherein the detecting step includes setting a higher priority in order of any sharing infrastructure device performing V2P communication, any sharing infrastructure device performing V2I communication, and any sharing infrastructure device performing V2V communication;
- wherein the detecting step includes setting a higher priority for any sharing infrastructure device closer to the autonomous cooperative traveling vehicle than any other sharing infrastructure devices performing the same communication.

6. The bidirectional link method of claim 5, wherein the link control step includes selecting only vehicle-related information from the decoded infrastructure information based on the detected communication standard and performing support so that the autonomous cooperative traveling vehicle uses the selected information.

7. The bidirectional link method of claim 5, wherein the link control step includes first performing the decoding before the encoding to preferentially support the collection of information on the autonomous traveling of the autonomous cooperative traveling vehicle when the encoding and the decoding are requested simultaneously.

8. The bidirectional link method of claim 5, wherein the link control step includes dividing the vehicle information to be encoded into a plurality of pieces when a data capacity of the vehicle information exceeds a preset capacity, and encoding each of the pieces of divided vehicle information.

9. An autonomous cooperative traveling vehicle for performing autonomous traveling while performing V2X communication with a plurality of autonomous traveling infrastructure devices, the autonomous cooperative traveling vehicle comprising:
- an autonomous traveling control device configured to collect information related to the autonomous cooperative traveling vehicle to generate vehicle information, and controls the autonomous traveling;
- a communication terminal device configured to transmit the vehicle information to the plurality of autonomous traveling infrastructure devices or receive infrastructure information of the plurality of autonomous traveling infrastructure device; and
- a bidirectional link device disposed between the autonomous traveling control device and the communication terminal device to support the V2X communication so that the vehicle information and the infrastructure information are shared, wherein the bidirectional link device includes
- a communication standard detector configured to detect a communication standard of at least two sharing infrastructure devices, the at least two sharing infrastructure devices being among the plurality of autonomous traveling infrastructure devices that will perform the V2X communication among the plurality of autonomous traveling infrastructure devices, wherein the at least two sharing infrastructure devices communicate using different communication standards, an encoder/decoder configured to encode the vehicle information of the autonomous cooperative traveling vehicle using the different detected communication standards and decode infrastructure information of the at least two sharing infrastructure devices; and a link controller configured to control the encoding and the decoding according to a predetermined criterion;

wherein the detecting step includes setting a priority for each sharing infrastructure device and detecting each communication standard according to the set priority;

wherein the detecting step includes setting a higher priority in order of any sharing infrastructure device performing V2P communication, any sharing infrastructure device performing V2I communication, and any sharing infrastructure device performing V2V communication;

wherein the detecting step includes setting a higher priority for any sharing infrastructure device closer to the autonomous cooperative traveling vehicle than any other sharing infrastructure devices performing the same communication.

* * * * *